W. HAINSWORTH.
Bessemer Plant and Apparatus.

No. 238,110. Patented Feb. 22, 1881.

(No Model.) 4 Sheets—Sheet 2.

W. HAINSWORTH.
Bessemer Plant and Apparatus.

No. 238,110. Patented Feb. 22, 1881.

Witnesses.
Inventor William Hainsworth
By Attorney George H. Christy

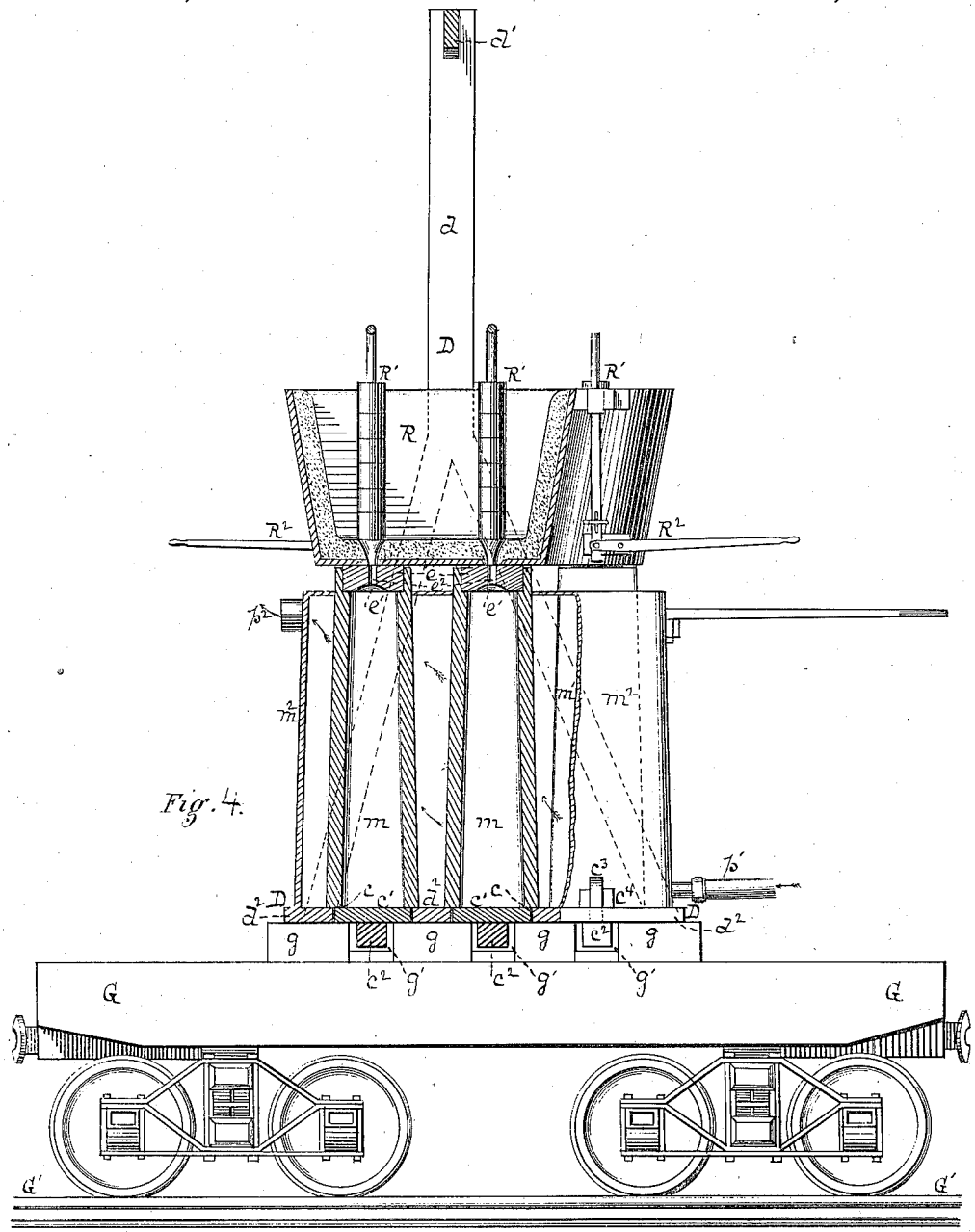

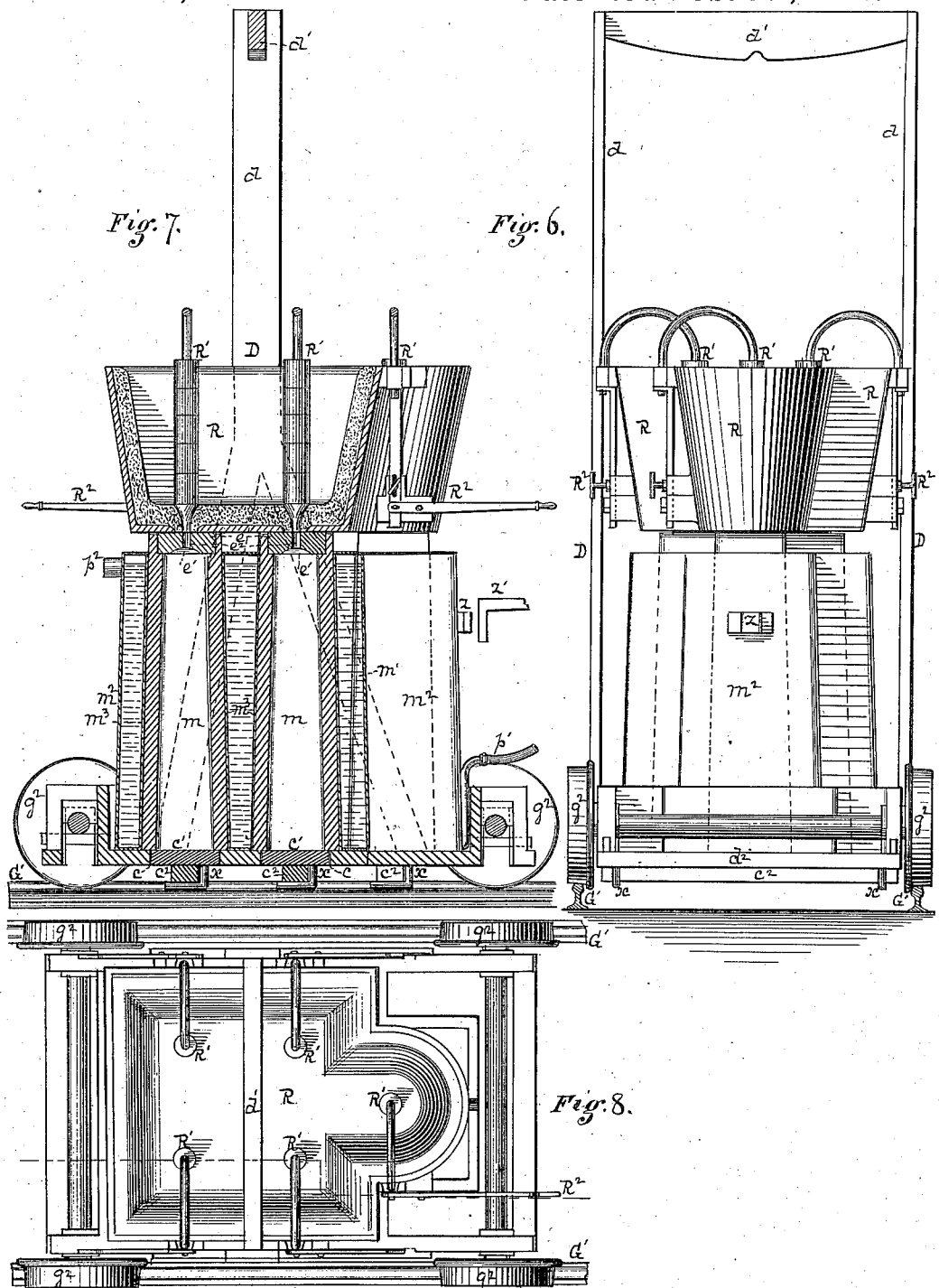

UNITED STATES PATENT OFFICE.

WILLIAM HAINSWORTH, OF PITTSBURG, PENNSYLVANIA.

BESSEMER PLANT AND APPARATUS.

SPECIFICATION forming part of Letters Patent No. 238,110, dated February 22, 1881.

Application filed December 30, 1880. (No model.)

*To all whom it may concern:*

Be it known that I, WILLIAM HAINSWORTH, of Pittsburg, county of Allegheny, State of Pennsylvania, have invented or discovered a new and useful Improvement in Bessemer Plant and Apparatus; and I do hereby declare the following to be a full, clear, concise, and exact description thereof, reference being had to the accompanying drawings, making a part of this specification, in which—like letters indicating like parts—

Figure 1:
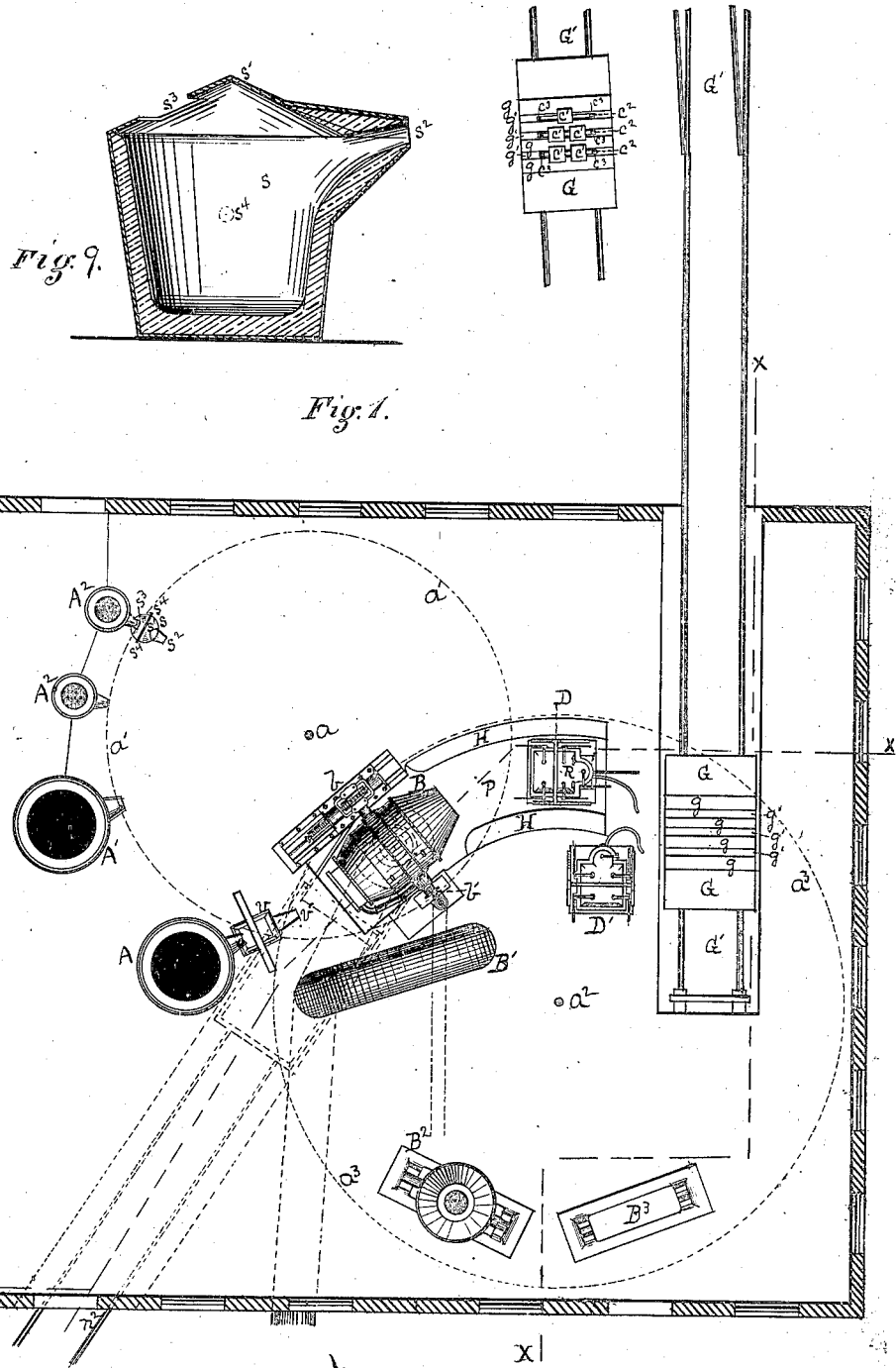
Figure 2:
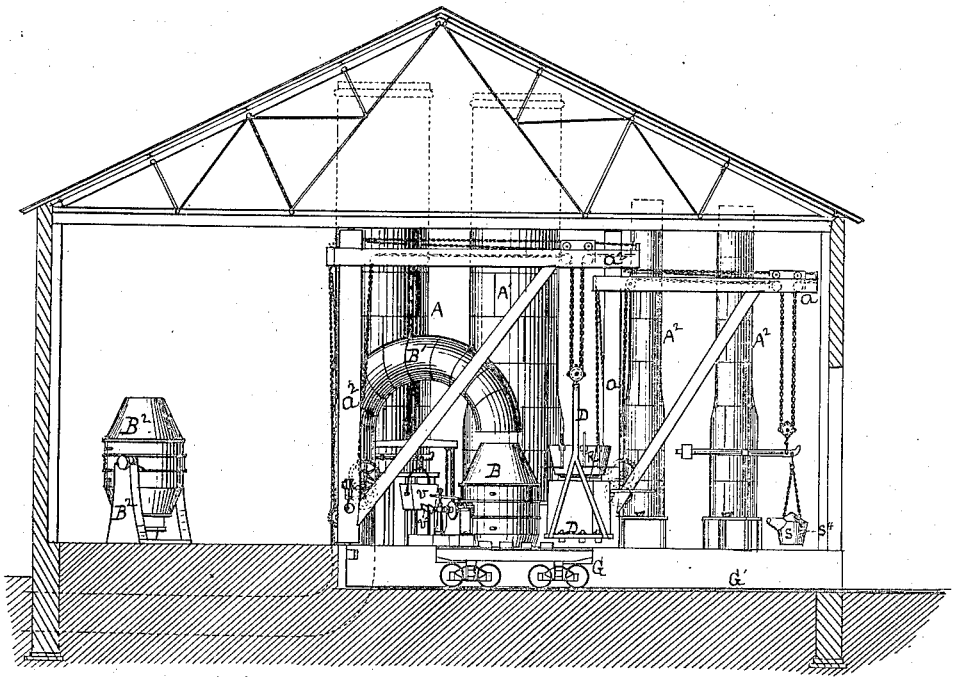
Figure 3:
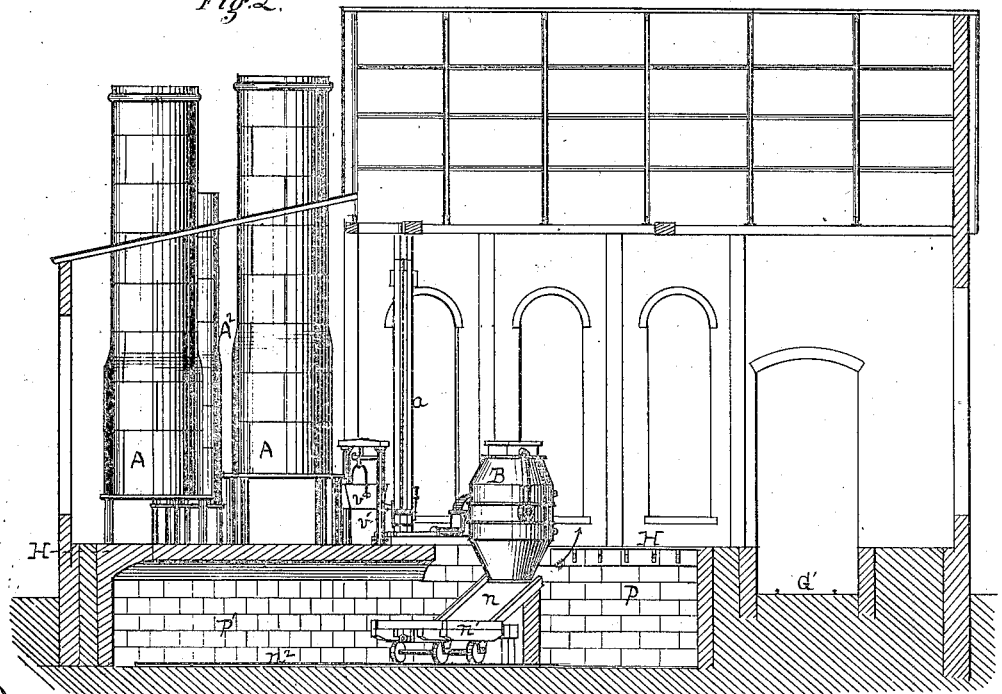

Figure 1, Sheet 1, is a plan view or diagram of the ground-floor arrangement of a Bessemer plant. Fig. 2, Sheet 2, is a vertical section of the plant and its accessories in the plane of the line $xx$ of Fig. 1. Fig. 3 is a like sectional view in the plane of the line $x'x'$ of Fig. 1. Fig. 4, Sheet 3, is a view, to an enlarged scale, of the car used in the moving of ingots, and onto which they are loaded or discharged directly from the molds, the latter, as also the casting-ladle, being represented chiefly in section, but partly in elevation. Fig. 5 is a transverse section, through the bottom of the ingot-frame and ingot-molds, of Fig. 3; and Figs. 6, 7, and 8 of Sheet 4 illustrate a modified construction of apparatus for the casting, disposing of and handling ingots.

At B, I have represented an ordinary Bessemer converter, suspended by trunnions and adapted to be rotated, in the usual way and for the usual purposes, by a hydraulic apparatus, $b$, and with the usual air-blast and valve-connections, as at $b'$.

Two cupolas or iron-melting furnaces are shown at A A', the nearer one, A, being the one ordinarily used, and the farther one, A', being designed for use in case of injury to the first one. Two spiegel furnaces or cupolas are represented at $A^2$, which may be of the usual or any known construction. All these cupolas are preferably arranged along near a circular line, $a'$, Fig. 1, which may represent the sweep of a crane, $a$, properly arranged and constructed for carrying thereon a ladle from any of the cupolas A' $A^2$ to a point convenient for pouring or running its contents into the converter-mouth.

B' is a pipe into which the converter discharges during the blowing operation, and which, instead of being of the form or construction of an ordinary chimney and hood, as heretofore, is made of goose-neck form, so as to lead down and back under ground, as indicated by dotted lines in Fig. 2, or otherwise, so that it will be out of the way, to any place where the surplus and otherwise waste heat may be used for usual purposes, such as heating a boiler, &c. This pipe B' is made with a swing or loose joint at any desirable point, so that when necessary or desirable it may be shifted to one side, as illustrated in Fig. 1.

One object I have in view in connection with the present invention is to dispense with the large pit in which the casting of Bessemer ingots is ordinarily done, and more especially to avoid the necessity of carrying on in so dangerous a place as the pit the manual operations connected with the preparation of the molds, the work of casting, and the removal of the ingots. These elements of danger in the ordinary way of doing such work are many and serious, and sometimes exceedingly disastrous.

To this end, on the pouring side of the converter, I make a comparatively small pit, P, large enough and deep enough for the purposes presently to be stated. By means of a crane, $a^2$, properly arranged for bringing the pit P and converter B within its sweep, (which latter may be represented by the dotted line $a^3$, Fig. 1,) I provide for carrying a mold-cage, D, and molds thereon, and a ladle on the molds, in the manner more fully shown in Figs. 4 and 5 of Sheet 3.

The ingot-mold cage D consists of side bars, $d$, united by cross-bar $d'$, by which it is suspended to the crane-chain, and a bottom plate, $d^2$, made in one piece with or securely fastened to the side bars, $d$.

On the bottom plate, $d^2$, I arrange the ingot-molds, in nests of any desired number, but, as shown in the drawings, there are five, of which four, $m$, are for receiving the regular or ordinary charge, and a fifth, $m'$, is added for receiving the excess of metal, if there be any, after the others are filled. A hole, $e$, is made in the bottom plate, $d^2$, immediately beneath each mold, and such hole is made a little larger than the largest area of the ingot in cross-section, so that the ingots may at the proper time be readily discharged through such holes.

Each hole is closed, preparatory to casting, by a neatly-fitting plate or block, $c'$, made of fire-clay or other suitable material, and these blocks are supported and kept in place by cross-bars $c^2$, passing beneath the blocks, and the bars $c^2$ are then secured to the cage by lugs $c^3$ and keys $c^4$, or in other suitable way.

The ingot-molds are made in the usual way, except that I provide, by a slight shoulder or offset, for inserting in the upper end of each a cover, $e$, made of fire-clay or other suitable material. Each cover is made concave or hollowing on its under side, as at $e'$, and it is perforated centrally, as at $e^2$, so as to form a casting hole or sprue, through which the casting is to be done; also, the upper face of each cover $e$ projects slightly above the end of its mold, as shown, or at least is fully flush therewith, so that the weight of the ladle R shall come wholly or in part on such covers, and keep them securely in place. The object of the cavity $e'$ on the under side of the cover $e$ is to provide an excess of metal in the axial line of the ingot, so that as the ingot solidifies and cools from the outside toward the center and shrinks from the center outwardly such excess of metal will compensate for such shrinkage, and give as a result a square-ended ingot, or one approximately so, and one which will, as a result thereof, work with less waste from "crop ends."

The ladle R is of the usual construction, except that, being made with a bottom large enough to cover and rest on all the covers $e$ of the nest, it has a casting sprue or gate immediately over each cover-sprue, $e^2$, and in line therewith. The usual stoppers, R', are added, and any suitable mechanism, $R^2$, for raising the stoppers.

I also consider it desirable to employ an air-blast or a water-jacket around the ingot-molds for the purpose of keeping their temperature down, as well as for the purpose of facilitating the solidification of the ingots. To this end (assuming, for the present, the use of an air-blast) I surround the nest of molds with a jacket, $m^2$, close at top and bottom, and provide a blast-inlet, $p'$, and an outlet, $p^2$. By means of a suitable coupling a pipe from the air-blast apparatus can be coupled to and disconnected from the pipe $p'$ at pleasure.

The cage with molds and ladle thereon is, when the charge in the converter is ready for pouring, swung by the crane $a^2$ into position over the pit P, and then is lowered into the pit and brought to a proper position therein, so that as the converter is rotated to the pouring position, it will discharge or pour into the ladle R. As soon as all the steel or good metal is poured out the cage is swung back, hoisted, and transferred onto a car, G, which can be run on a track, G', to a point within the sweep of the crane. This car G, Figs. 1 and 3, is fitted up with bearings $g$, with intermediate recesses, $g'$, so as to form a bearing-frame on which the cage may rest, the bars $c^2$ entering the recesses $g'$, and the bottom plate, $d^2$, of the cage resting on the bearings $g$. The stoppers may then at once be withdrawn, or such withdrawal of the stoppers may be done as soon as the cage is raised to the ground or floor level, or while being transferred to the car, and the casting be done in the usual way. The four main molds $m$ may all be filled at once or one at a time in succession, and if any metal is left after this is done it may be run into the fifth or extra mold, $m'$. As soon as the molds have solidified, the keys $c^4$ are knocked out, so as to loosen the bars $c^2$ and bottom blocks, $c'$, and the cage is again hoisted by the crane, with the result of leaving the bars $c^2$ and the blocks $c'$ resting on the car, and also of allowing the ingots to pass or drop out of the open bottoms of the molds. Then the car, with the ingots thereon, is run off to the bloomery or other place of working or storage on the track G'. The ingots may then be hoisted off the car. It will be observed that the bars $c^2$ and blocks $c'$ still remain on the car and exactly or approximately in position to be again affixed to the cage, as illustrated in the plan view of the car on the upper part of Sheet 1, where it will be understood that the track-rails on which the car stands is a section of the track G', or of its siding, put to one side for convenience of illustration. The cage, as lifted off with its molds and ladle, is, as soon as lifted off, deposited on the ground or floor, as at D', Fig. 1, for refitting or for being made ready for another pouring and casting operation; but during all this time another pouring and casting operation will have been done by the use of another cage, molds, ladle, and car, the duplicates of those already described. As one car is run off beyond the switch on one track, another is run up from the other track, and while one cage and its molds and ladle are being prepared for a new charge, another cage with molds and ladle is in use for receiving a charge and casting it into ingots in the manner described; and thus cars and cages alternate in use and the work goes on rapidly without exposing the workmen to any such dangers as are incident to pit casting; also, as all the manual labor is done on or above the level of the ground, it can be done under better and more favorable conditions as to light, ventilation, and cleanliness, and without trouble from a lack of room; also, as the ingots can be handled more expeditiously, they can be charged into a reheating-furnace while still retaining the greater part of their heat, so as to effect a saving in fuel and enable the work to go forward more rapidly, whereby from a given plant a greater output may be secured.

I also provide for getting rid of the waste, slag, or scoriæ left in the converter at the end of the pouring operation, whereby I avoid the danger incident to casting it in a button on the sand in the bottom of the pit. For this purpose I arrange a chute or spout, $n$, in the pit, Fig. 3, in proper position for receiving on its upper end the molten slag as soon as the converter is rotated beyond the point necessary in running off the good metal, and the slag running down such chute or spout is discharged into a sand-bed or into a suitable mold on the car $n'$, which latter is run off on a track, $n^2$, laid in a tunnel, P', to any desired point for dumping. At $B^2$ and $B^3$, Figs. 1 and 2, I have shown bearing-frames for one or more extra converters, with which to replace the one in use when it burns out or requires repairs, and on which such repairs can be made.

In the arrangement described I am enabled to locate the main cupola A quite near to the converter, so that as the metal is run from the cupola A into a ladle, $v$, and weighed, it may, by a short spout, $v'$, Fig. 1, be run directly into the converter-mouth, which, of course, is to be tilted over or back for the purpose. When necessary to take metal from the other cupola it may be run into a ladle, as before, and then swung, by crane $a$, to the head of the spout $v'$; but as the spiegel is liable to rapid oxidation if put into an open ladle or run any distance by a spout, I prefer to employ a ladle, $s$, (shown to an enlarged scale in Fig. 9,) where it is represented as having a close top, $s'$, having only a small opening, as at $s^3$, through which to fill it from the tap-hole of the spiegel cupola, and having a pouring-spout, $s^2$, on the opposite side. This ladle is suspended from the crane $a$ by trunnions $s^4$, with an interposed weighing apparatus, if so desired, and on being filled it may be swung around or run on a carriage and its contents poured directly into the converter-mouth, when the latter is tilted slightly forward, so as to experience little or no loss by oxidation. By thus avoiding all occasion for the employment of manual labor in the pit I render it practicable to make the pit much deeper than is usual, and as a consequence I am enabled to lower the level of the platform or working-stage H where most of the work is done. Hence I also lower correspondingly the converter and cupolas, so that all are at, or nearly down to, the level of the ground, whereby I effect a great saving in the cost usually incurred in elevating to a considerable height the large amount of material required in supplying and working a Bessemer converter. Also, all the appliances are so arranged that the carrying on of the necessary work and operations is greatly facilitated, so that from the beginning to the end of the operation the amount of manual labor required is greatly lessened, as well as its safety enhanced.

I have shown the cage, car, and casting apparatus in a somewhat modified form in Figs. 6 to 8 of Sheet 4, where Fig. 6 is an end elevation; Fig. 7 is a vertical section, but partly in elevation; and Fig. 8, a top or plan view. Like letters in these figures represent the same as before. The only changes of importance are, that the truck-wheels $g^2$ are attached to or connected with the bed-plate $d^2$ of the cage, so as to be hoisted and moved therewith. After the casting is done, the cage, trucks, molds, ingots, and all are run off on the track G', Fig. 1, to any suitable place of unloading.

It will be observed that in this modification the bars $c^2$ are supported by hooks or open-sided clips $x$. As soon as the apparatus reaches the place of discharging the ingots, either on a raised track or over a pit, the bars $c^2$ engage suitable knockers provided for the purpose, which force the bars out of their supports and let them with the blocks $c'$ drop out of the way, whereupon the ingots drop through the bottom plate, $d^2$, onto a chute leading to another car below, by which they are conveyed to the bloomery. The apparatus is duplicated, as before, so that the work may go on continuously. Also, instead of using an air-blast around the ingot-molds, I provide, in this case, for a water-jacket for the same purposes. The jacket $m^2$ has tubular connections $m^3$ from one end to the other, corresponding in number, size, form, and arrangement to the ingot-molds, so as to make a tight water-casing entirely surrounding each mold. Water is supplied and discharged by like means and connections as the air. In the use of apparatus thus modified it may sometimes be desired to do the casting before the cage, &c., are shifted to the track, and while it is still swinging from the crane, as the casting of one ingot on one side of the nest might in such case tend to tip the cage too much for good work. I fasten a clip, $z$, on the end of the cage or of the water-jacket case, so that a workman may insert the end of a lever, $z'$, of any suitable length therein, and by the use of the lever prevent any objectionable tilting of the nest of ingots.

The means for opening and closing the holes through the bottom plate, $d^2$, of the cage for the purposes described, may be varied at pleasure, provided such holes be capable of being opened and closed from below in such manner as to provide for the discharge of the ingots through the bottom of the cage.

The object of supporting the ladle R partly or wholly on the mold-covers $e$ is to hold the covers $e$ securely in place, so that any lifting action which otherwise the fluid steel might have thereon as the mold becomes full is thereby prevented, and an ingot is secured having a well-formed upper end; and also greater uniformity in the sizes and shapes of the several ingots will be secured; and while the ingots may be cast one at a time, as already stated, I prefer to cast all at once by simultaneously (as nearly as practicable) raising all the stoppers at once, so that all shall be cast at the same temperature, or with the metal in the same condition.

In so far as the waste-pipe B' may be usable for conveying heat to other points for useful purposes, no claim is made herein, but the same is reserved for the subject-matter of a separate application.

I claim herein as my invention—

1. An apparatus to be used in connection with a Bessemer plant for the pouring, casting, and removal of ingots, consisting of a cage adapted to be swung by a crane in one part of the operation, and to be run on a track in another part of the operation, said cage having holes in its bottom plate corresponding in size, number, and arrangement to the size, number, and arrangement of the nest of ingot-molds thereon, said holes being closed and opened from below for the removal of the ingots through the bottom of the cage, substantially as described.

2. In combination with a swinging cage having openings in its bottom closed and opened from below, a nest of ingot-molds arranged one over each such opening, and a ladle above and covering or extending over the entire nest of molds, and having a sprue or gate opening therefrom into the mold directly beneath it, substantially as set forth.

3. In combination with an ingot-mold, a cover, $e$, adapted to fit into and be supported in the mouth of the mold, made with a casting sprue or gate, $e^2$, directly through the same, and with a cavity, $e'$, on its under side, substantially as set forth.

4. In combination with a nest of ingot-molds standing on a common level and of uniform height, and with a ladle extending over and covering the same, and provided with a sprue or gate over each mold, a cover, $e$, in each mold-mouth, centrally perforated and hollowing on its under side, and of suitable vertical height relative to the mold, for receiving and carrying some or all of the weight of the ladle, substantially as set forth.

5. In combination with a nest of molds arranged on a movable cage, a jacket surrounding such molds, and air or water supply and discharge pipes, for applying an air-blast or water-jacket to the molds, substantially as set forth.

6. A cage, D, carrying molds and ladle thereon, made with holes in its bottom plate for the downward discharge of the ingots from the molds, and supplied with blocks $c'$, transverse bars $c^2$, and suitable fastenings for securing such bars to the cage, in combination with the bearings and recesses $g$ $g'$ of a car-platform, arranged substantially as set forth, whereby, when the cage is seated on the car and the fastenings are loosened, the cage may be lifted off and the ingots removed, while leaving the blocks and bars in the proper position to be attached to the same or to another like cage, substantially as set forth.

7. In a Bessemer plant, the construction, for conjoint operation, of a system of apparatus consisting of a rotary converter, a pit, P, of proper size and depth for the swinging under the mouth of the converter, when in a pouring position, of a cage carrying a nest of ingot-molds and a ladle thereon, a crane for lowering and swinging the cage into position under the pouring-mouth, and for swinging it away, raising it out of the pit, and transferring it onto a track arranged within the sweep of the crane, substantially as set forth.

8. An improved ladle, $s$, having side trunnions, $s^2$, a close top, $s'$, a filling-opening, $s^3$, and a pouring-spout, $s^4$, substantially as set forth.

9. The swing-pipe B', in combination with converter B, substantially as set forth.

In testimony whereof I have hereunto set my hand.

WILLIAM HAINSWORTH.

Witnesses:
R. H. WHITTLESEY,
GEORGE H. CHRISTY.